(12) United States Patent
Renard et al.

(10) Patent No.: US 8,507,381 B2
(45) Date of Patent: Aug. 13, 2013

(54) METHOD FOR FABRICATING SILICON AND/OR GERMANIUM NANOWIRES

(75) Inventors: Vincent Renard, La Buisse (FR); Vincent Jousseaume, Le Sappey en Chartreuse (FR); Michael Jublot, Nevoy (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 136 days.

(21) Appl. No.: 12/767,707

(22) Filed: Apr. 26, 2010

(65) Prior Publication Data

US 2010/0273316 A1  Oct. 28, 2010

(30) Foreign Application Priority Data

Apr. 28, 2009  (FR) .................................. 09 52780

(51) Int. Cl.
*H01L 21/443*  (2006.01)

(52) U.S. Cl.
USPC ............... 438/680; 257/E21.17; 427/255.28; 427/305; 438/687; 977/762

(58) Field of Classification Search
USPC ............ 977/762; 438/680, 687; 427/255.28, 427/305; 257/E21.17
See application file for complete search history.

(56) References Cited

U.S. PATENT DOCUMENTS

| 8,257,520 B2 * | 9/2012 | Gash et al. ..................... 149/2 |
| 2010/0291408 A1 * | 11/2010 | Choi ............................. 428/687 |
| 2010/0314600 A1 * | 12/2010 | Lee et al. ...................... 977/762 |

OTHER PUBLICATIONS

Wagner et al., "Vapor-Liquid-Solid Mechanism of Single Crystal Growth", Applied Physics Letters, vol. 4, No. 5, dated Mar. 1, 1964, pp. 89-90.
Wang et al., "Epitaxial Growth of Silicon Nanowires Using an Aluminium Catalyst", Nature Nanotechnology, vol. 1, (Nature Publishing Group, 2006) pp. 186-189.
Yao et al., "Si Nanowires Synthesized with Cu Catalyst", Material Letters, vol. 61, No. 1, dated Jan. 1, 2007, pp. 177-181.
Lin et al., "Growth of $SiO_2$ nanowires without a catalyst via carbothermal reduction of CuO powders", Nanotechnology, vol. 16, No. 9, (IOP Publishing Ltd., Sep. 1, 2005), pp. 1648-1654.
Ko et al., "$SiO_2$- and CuO-enhanced growth of $Ge-Si_{1-x}Ge_xO_y$ and $GeO_2-Si_{1-x}Ge_xO_y$ core-shell nanowires on a Si substrate via carbothermal reduction", Nanotechnology, vol. 17, No. 17 (IOP Publishing Ltd., Sep. 14, 2005), pp. 4464-4468.

* cited by examiner

*Primary Examiner* — Zandra Smith
*Assistant Examiner* — Toniae Thomas
(74) *Attorney, Agent, or Firm* — Miles & Stockbridge P.C.

(57) ABSTRACT

The invention relates to a method for fabricating silicon and/or germanium nanowires on a substrate, comprising a step of bringing a precursor comprising silicon and/or a precursor comprising germanium into contact with a compound comprising copper oxide present on the said substrate, by means of which growth of nanowires takes place.

15 Claims, 4 Drawing Sheets

METHOD FOR FABRICATING SILICON AND/OR GERMANIUM NANOWIRES

TECHNICAL FIELD

The present invention relates to a method for fabricating silicon and/or germanium nanowires.

This method has its application in the production of passive or active components, particularly in the design of capacitors or transistors, which are intended to be used for the fabrication of integrated circuits, for example CMOS integrated circuits (CMOS standing for "Complementary Metal Oxide Semiconductor"), in so far as this method makes it possible to operate in temperature ranges which are compatible with this type of circuit and make it possible to preserve the integrity of the devices integrated in the lower levels as well as the interconnection materials present in these circuits. It thus makes it possible to provide an alternative to the lithography/etching methods (referred to as "top-down"methods) currently used in this field.

This method may also have its application in the field of optics, photovoltaic production, energy storage or chemical and biological detection.

The field of the invention may be considered as that of preparing nanowires, in particular silicon nanowires.

PRIOR ART

Conventionally, nanowires are produced on a substrate by growth resulting from the chemical dissociation of precursor gases, catalyzed by metallic elements.

This is the case for silicon nanowires prepared from a metallic gold catalyst and silicon-based gaseous precursors according to a vapour-liquid-solid mechanism (also referred to as a VLS mechanism), as described in *Applied Physics Letters*, Vol. 4, No 5, p. 89-90 [1].

More precisely, the fabrication of silicon nanowires has been carried out in the following way:
- a step of depositing a layer of metallic gold on a silicon substrate with a given crystal orientation (<111>) in a growth chamber;
- a step of heating the substrate, so as to cause dewetting of the said layer in the form of solid metallic gold particles by minimizing the surface energy and the interaction of the gold layer with the substrate;
- a step of introducing a gaseous silicon-based precursor $SiCl_4$ into the growth chamber in the presence of hydrogen;
- a step of heating the said chamber to a temperature higher than the eutectic temperature of the Au/Si system.

Fundamentally, the growth of silicon nanowires using the metallic gold catalyst can be explained on the basis of the Au/Si phase diagram represented in appended FIG. 1 (the ordinate representing the temperature T(° C.) and the abscissa representing the silicon content % at Si).

At the temperature higher than the eutectic temperature (Point A in FIG. 1, the eutectic temperature being represented by the point E), the aforementioned gaseous precursor disassociates in contact with the metallic gold particles, thus contributing to gradual incorporation of silicon atoms into the said particles. This phenomenon is manifested on the phase diagram by a shift along a horizontal line from the point A, representing enrichment of the metallic gold particles with silicon. When the amount of silicon incorporated is large enough, the particles enter the liquid state (starting from the point B of the diagram). When their silicon content continues to increase, a new thermodynamic equilibrium is created starting from a silicon content corresponding to the point C in the diagram, this new equilibrium being manifested by precipitation of solid silicon particles at the base of the drop formed on the substrate. Beyond the content indicated by the point C, for example at the point D, growth of nanowires takes place so long as the supply of silicon is not stopped. The period between dewetting and precipitation is usually referred to as an incubation phase.

Thus, gold can constitute an advantageous catalyst for the growth of high-quality silicon nanowires.

However, when the nanowires are intended to be integrated into devices such as devices belonging to the "above IC" sector, this catalyst can no longer be used because it is considered to be a contaminating element and is therefore proscribed by manufacturers. Furthermore, it gives rise to the creation of deep recombination centres in the silicon, thus greatly impairing its electrical properties.

The use of this catalyst is therefore currently impossible in industrial clean rooms, in particular those where so-called "CMOS" electronic devices are developed (CMOS standing for "Complementary Metal Oxide Semiconductor").

In order to overcome this obstacle, some authors have focused their work on the use of other metallic catalysts, such as aluminium as described in *Nature Technology*, Vol. 1, December 2006, p. 186-189 [2] or metallic copper as described in *Material Letters*, 61 (2007), p. 177-181 [3].

These metals, however, only allow synthesis of nanowires (including both the step of the wetting the metal and the incubation step, and then the growth step per se) at high temperatures (above 500° C.), which makes these catalysts difficult to use for applications which do not tolerate such high temperatures.

Thus, there is currently a genuine need for a method for fabricating silicon and/or germanium nanowires which overcomes the aforementioned drawbacks and has the following advantages:
- a method which can be carried out at temperatures lower than 450° C., thus making it possible to widen the range of applications of this method to fields which do not tolerate very high temperatures, and also contributing to reduction of the heat budget associated with its implementation;
- a method which does not cause contamination of the nanowires due to the constituent elements of the catalysts;
- a method which makes it possible to obtain nanowires which are organized in terms of crystallinity and have few defects.

SUMMARY OF THE INVENTION

The authors have surprisingly discovered that, by using a particular compound, it is possible to overcome all the drawbacks mentioned above.

Thus, the invention relates to a method for fabricating silicon and/or germanium nanowires on a substrate, comprising a step of bringing a precursor comprising silicon and/or a precursor comprising germanium into contact with a compound comprising copper oxide present on the said substrate, by means of which growth of nanowires takes place.

It should be pointed out that silicon and/or germanium nanowires are intended to mean silicon nanowires, germanium nanowires or nanowires comprising both silicon and germanium.

By operating in this way, namely by bringing the precursors comprising silicon and/or germanium in contact with a compound comprising copper oxide, the authors have gone against the commonly accepted idea that the growth of nanowires cannot be carried out in the presence of an oxide compound, as it has been possible to observe with aluminium.

Furthermore, the authors have been able to demonstrate that the use of a compound comprising copper oxide allows the growth temperature of the nanowires to be reduced greatly in comparison with the embodiments proposed in the prior art.

Moreover, compounds comprising copper oxide are permitted in clean rooms in which electronic devices are fabricated.

The substrate on which the method is carried out may be a silicon substrate, optionally covered with a barrier layer against the diffusion of copper present in the said compound. This barrier layer may be made of a metal such as tantalum, a metal nitride such as tantalum nitride or titanium nitride, and optionally a mixture of both a metal and a metal nitride, such as a TaN/Ta mixture.

Prior to the contact step, the method of the invention may furthermore comprise a step of fabricating the compound comprising copper oxide on the substrate.

This step may be carried out according to different variants.

According to a first variant, it may consist in depositing the compound comprising copper oxide directly on the substrate by electrochemistry or reactive sputtering.

According to a second variant, it may consist first in depositing metallic copper (that is to say copper in oxidation state zero) on the substrate by conventional deposition techniques such as physical vapour deposition, chemical vapour deposition and electrochemical deposition, then, secondly, in fully or partially oxidizing the metallic copper to form copper oxide. It is also conceivable to combine a deposition technique as mentioned above with a lithography step in order to obtain a particular deposition geometry.

This oxidation step may conventionally consist in passing a stream of oxygen over the metallic copper deposited on the said substrate, the oxygen pressure and the time for which it is passed being controlled so as to obtain the desired level of oxidation. This step may also consist in applying an oxygen plasma to metallic copper.

For example, the oxygen pressure may range from 0.1 Torr to 100 Torr, and the passage time may range from 5 seconds to several tens of minutes.

Once the oxidation has been carried out, the substrate having on its surface the compound comprising copper oxide is brought into contact with a silicon-based precursor and/or a germanium-based precursor.

This compound comprising copper oxide is advantageously in the form of particles which are separate from one another. The compound comprising copper oxide may consist only of copper oxide or of a mixture of metallic copper and copper oxide.

The precursor comprising silicon may be silane $SiH_4$, disilane $(Si_2H_6)$ or trisilane $(Si_3H_8)$.

The precursor may also be a halosilane $SiX_4$, X being a halogen atom, for example a chlorine atom.

The precursor comprising germanium may be germane $(GeH_4)$, digermane $(Ge_2H_6)$ or trigermane $(Ge_3H_8)$.

The precursor may be diluted with a neutral carrier gas such as nitrogen $N_2$, argon Ar or helium He.

The precursor may also be diluted with a reducing gas $H_2$ or $NH_3$.

When the silicon and/or germanium nanowires contain at least one doping element, besides contact with the aforementioned precursors, the contact step will also comprise contact with a doping agent such as diborane or phosphine.

Specifically, the contact step of the invention may consist in passing a stream of precursor comprising silicon and/or precursor comprising germanium, optionally in the form of a plasma, and optionally a carrier gas and/or a reducing gas and/or a dopant, over the compound comprising copper oxide, with a flow rate and for a time which are effective for obtaining growth of nanowires based on silicon and/or germanium. This corresponds to the chemical vapour deposition technique (CVD). The deposition may also be aided by a plasma (for example according to the PECVD technique, corresponding to "Plasma Enhanced Chemical Vapour Deposition").

For example, the flow rate of precursor may range from 1 sccm to 5000 sccm, and the passage time may range from 10 seconds to several hours.

This contact step is conventionally carried out at a temperature of less than 450° C., for example less than 400° C., in particular when the method is intended to be carried out in the microelectronics sector. It may also be carried out at higher temperatures if need be.

Besides the steps mentioned above, when it comprises a step of preparing the compound comprising copper oxide by oxidation of metallic copper, the invention may also comprise the following steps:
- a step of bringing the metallic copper present on the surface of the substrate in contact with a reducing agent, before the oxidation step;
- optionally, a pumping step so as to remove the reducing gas after the aforementioned contact step and before the oxidation step;
- a pumping step before the step of contact with the precursor comprising silicon and/or the precursor comprising germanium, so as to remove the unreacted oxygen of the oxidation step.

The step of contact with a reducing agent may specifically consist in passing a stream of reducing agent, optionally in the form of a plasma, over the metallic copper so as to remove any trace of oxide which may be present in the copper. The purpose of this step is to make it possible to control the oxidation of the copper and restrict it only to the aforementioned oxidation step. The reducing agent may be ammonia $NH_3$ or hydrogen $H_2$.

The pumping steps conventionally consist in connecting the chamber, in which the method of the invention is carried out, to a vacuum pump for extracting any gas present in the compartment.

When this step is intended to eliminate the presence of the reactive gas, this makes it possible to avoid subsequent contact between this agent and the one which makes the copper oxidation step possible.

When this step is intended to eliminate the presence of the oxygen used during the copper oxidation step, this will make it possible to avoid subsequent contact between oxygen and the precursor comprising silicon, such as $SiH_4$, which contact may generate an explosive mixture in certain proportions.

The method may be a method for fabricating silicon nanowires.

According to a particular embodiment, the method of the invention comprises:
- a step of oxidizing metallic copper present on a substrate by passing a stream of oxygen, by means of which the compound comprising copper oxide is obtained;
- a step of bringing the said compound into contact with a stream of $SiH_4$, optionally in the form of a plasma, for a time which is effective for obtaining growth of silicon nanowires.

According to an alternative embodiment, the method of the invention comprises:
- a step of depositing the compound comprising copper oxide on the substrate;
- a step of bringing the said compound into contact with a stream of $SiH_4$, optionally in the form of a plasma, for a time which is effective for obtaining growth of silicon nanowires.

The method of the invention makes it possible to obtain silicon-based nanowires, such as crystalline silicon nanowires having few or no crystal defects, which makes them more suitable for electrical transport.

The nanowires obtained by the method according to the invention advantageously have a diameter ranging from 5 nm to 500 nm and, for example, a length ranging from 10 nm to several micrometres or tens of micrometres.

The method of the invention may find use in many fields, among which the following may be mentioned:
- the production of passive components, such as capacitors, in particular on integrated circuits (this case is referred to as producing "above IC" components), the temperatures for carrying out the method not generating any degradation of the underlying integrated circuits;
- the production of photovoltaic cells;
- the production of electrodes of batteries, such as batteries operating with lithium;
- the production of sensors for chemical and biological detection.

The invention will now be described with reference to the following examples, which are given by way of illustration and without implying limitation.

DETAILED DESCRIPTION OF PARTICULAR EMBODIMENTS

EXAMPLE 1

In this example, silicon nanowires are produced by a particular embodiment according to the method of the invention. This example was carried out with industrial deposition equipment of the CENTURA 5200 type receiving 200 mm substrates.

The substrate used is a silicon substrate having a (100) crystal orientation, whose face intended to act as a support for production of the nanowires is covered with a 10 nm TaN/Ta barrier layer.

A layer of copper with a thickness of 20 nm is deposited on the barrier layer by physical vapour deposition.

The substrate is then subjected to a stream of oxygen so as to partly oxidize the deposited copper.

In order to remove the oxygen which has not reacted during the oxidation step, the substrate is subjected to a pumping step, this being so as to avoid any contact subsequently between oxygen and the silicon precursor $SiH_4$, which mixture may turn out to be explosive.

Lastly, the substrate is subjected to a step of contact with a silicon precursor, silane $SiH_4$, at a pressure which is sufficient to generate growth of the nanowires.

The specific characteristics of the various steps mentioned above appear in the following table.

| Steps | Gas | Flow rate | Pressure | Time |
| --- | --- | --- | --- | --- |
| Oxidation | $O_2$ | 250 sccm* | 1 Torr | 180 s |
| Pumping | — | — | — | 20 s |
| Contact with silicon precursor | $SiH_4$ | 100 sccm* | 30 Torr | 2400 s |
| Pumping | — | — | — | 20 s |

*sccm signifying one cubic centimetre per minute under the following conditions (T = 0° C. (32° F.) and P = 101 325 Pa).

All the steps were carried out at a temperature of not more than 400° C.

Figure 1:
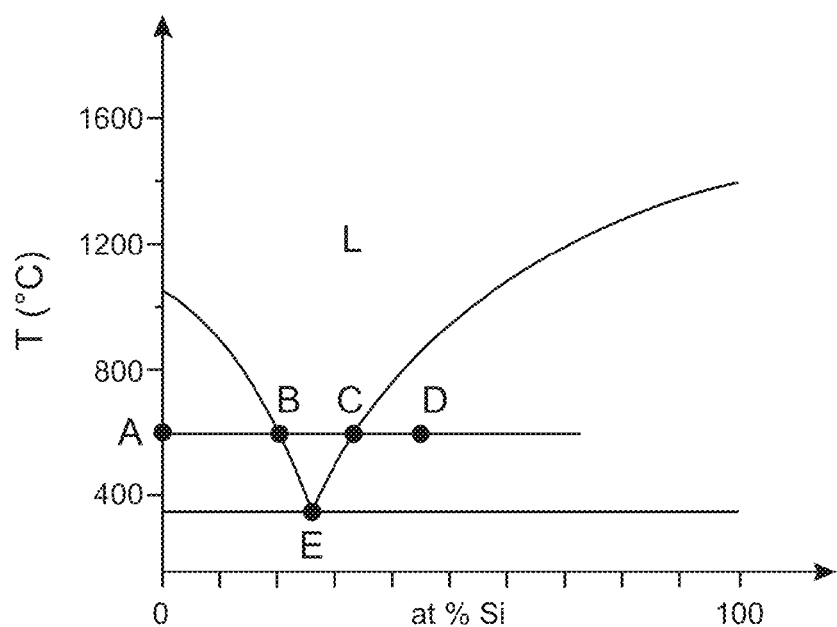
FIG. 1 represents a phase diagram for the Au/Si system.
Figure 2:
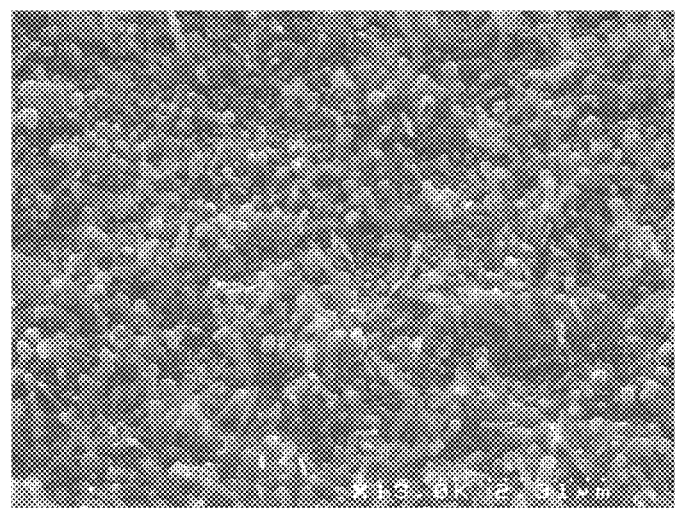
FIG. 2 is an image taken by scanning electron microscopy of the nanowires obtained according to the embodiment explained in Example 1 below.

An image of the substrate (view from above) obtained following this example, represented in FIG. 2, was taken by scanning electron microscopy (SEM) verifying effective growth of nanowires on the entire surface of the substrate.

EXAMPLE 2

In this example, silicon nanowires are produced by a particular embodiment according to the method of the invention. This example was carried out with industrial deposition equipment of the CENTURA 5200 type receiving 200 mm substrates.

The substrate used is a silicon substrate having a (100) crystal orientation, whose face intended to act as a support for production of the nanowires is covered with a 10 nm TaN/Ta barrier layer.

A layer of copper with a thickness of 20 nm is deposited on the barrier layer by physical vapour deposition.

The substrate is then subjected to a first pass of a stream of ammonia, then to a second pass in the form of $NH_3$ plasma, so as to remove the traces of oxide which may be present on the surface of the copper. This step is intended to make it possible to control the oxidation of the copper by basing it only on the selected formation of oxide by the subsequent pass of the stream of dioxygen.

In order to remove any traces of $NH_3$, the substrate treated in this way is subjected to a pumping step before being subjected to an oxidation step.

The subject is then subjected to a step of passing oxygen so as to partly oxidize the catalyst.

In order to remove the oxygen which has not reacted during the oxidation step, the substrate is again subjected to a pumping step, this being so as to avoid any contact subsequently between oxygen and the silicon precursor $SiH_4$, which mixture may turn out to be explosive.

Lastly, the substrate is subjected to a step of contact with a silicon precursor, silane $SiH_4$, at a pressure which is sufficient to generate growth of the nanowires.

The specific characteristics of the various steps mentioned above appear in the following table.

| Steps | Gas | Flow rate | Pressure | Time | Other |
|---|---|---|---|---|---|
| Deoxidation | | | | | |
| 1st pass | $NH_3$ | 200 sccm* | 6 Torr | 25 s | |
| 2nd pass (Plasma) | $NH_3$ | 100 sccm* | 6 Torr | 30 s | 250 W |
| Pumping | — | — | — | 20 s | — |
| Oxidation | $O_2$ | 250 sccm* | 2 Torr | 180 s | — |
| Pumping | — | — | — | 20 s | — |
| Contact with silicon precursor | $SiH_4$ | 100 sccm* | 30 Torr | 2400 s | — |
| Pumping | — | — | — | 20 s | — |

*sccm signifying one cubic centimetre per minute under the following conditions (T = 0° C. (32° F.) and P = 101 325 Pa)

All the steps were carried out at a temperature of not more than 400° C.

Figure 4:
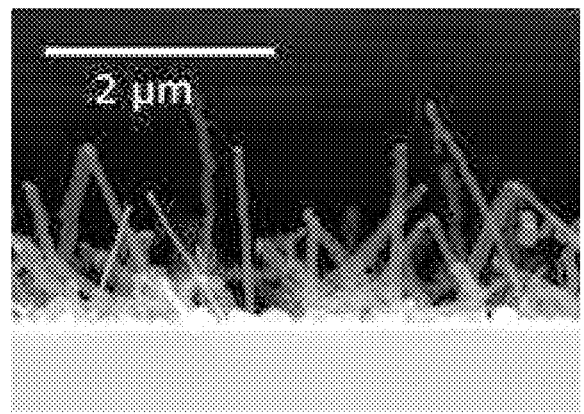
FIGS. 4 and 5 represent images taken by scanning electron microscopy (respectively a view in section and a view from above) of the nanowires obtained according to the embodiment explained in Example 2 below.

An image of the substrate (view from above) obtained following this example (represented in FIG. 5) was taken by scanning electron microscopy (SEM) verifying effective growth of nanowires on the entire surface of the substrate. FIG. 4 in turn verifies the presence of straight nanowires by giving a view of the same trial in section.

All other things being equal, another trial was carried out by adjusting the oxygen pressure applied during the oxidation step, namely for an oxygen pressure of zero (in other words, without an oxidation step).

Figure 3:
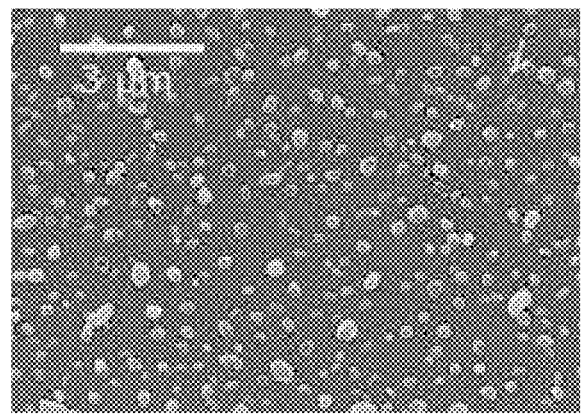
FIG. 3 is an image taken by scanning electron microscopy of a substrate (view from above), after a trial carried out without an oxidation step, according to what is explained in Example 2 below.

Images of the substrates obtained following this embodiment were produced, an example being represented in FIG. 3 (view from above) for the trial without an oxidation step.

FIG. 3 verifies the absence of nanowires and also confirms the necessity and efficacy of the present invention.

Figure 5:
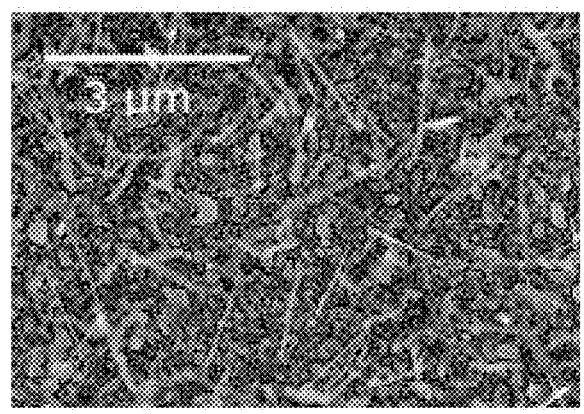

Analyses were also carried out by transmission electron microscopy (TEM) and by energy-dispersive X-ray spectroscopy so as to study in detail the structural quality of the nanowires presented in FIGS. 4 and 5.

Figure 6:
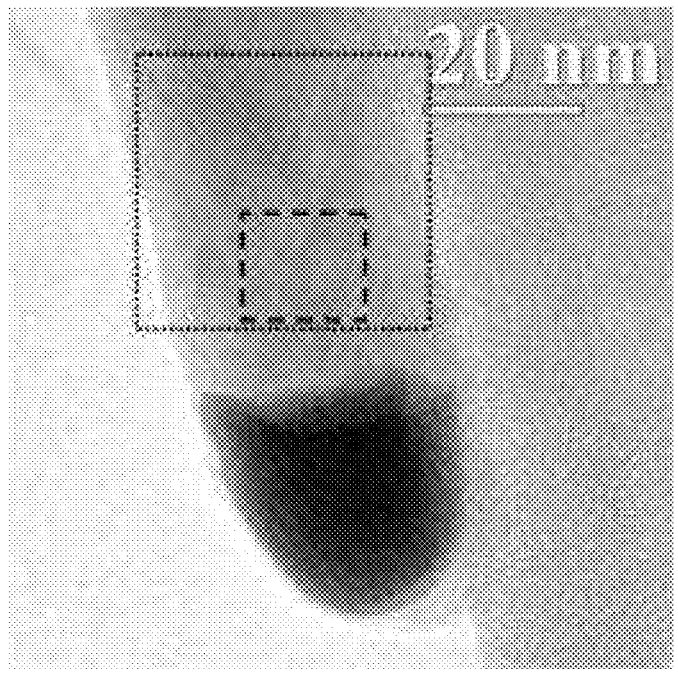
FIGS. 6 and 7 represent high-resolution images taken by transmission electron microscopy of a silicon nanowire with a diameter of 20-30 nm obtained according to Example 2 which appears below.
Figure 7:
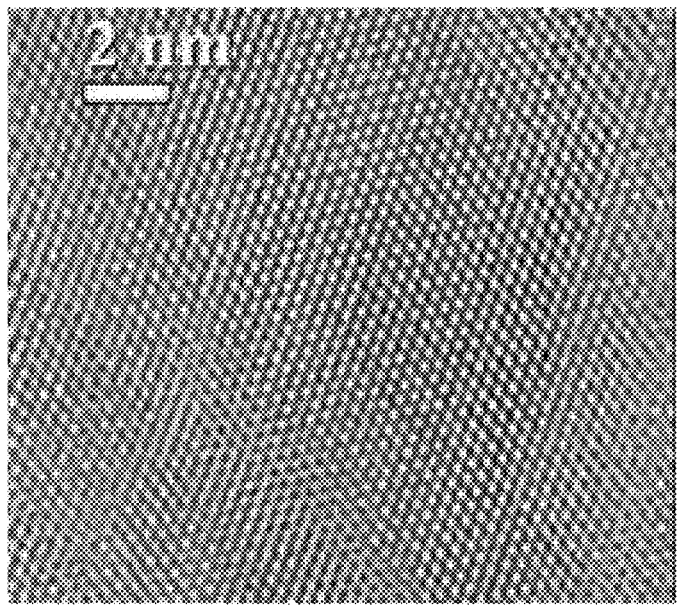

FIGS. 6 and 7 show high-resolution images of a silicon nanowire having a diameter of 20-30 nm with a magnification in FIG. 7, verifying perfectly crystalline organization of the nanowire and virtual absence of crystal defects. Here again, good conduction properties may be predicted for the nanowires obtained.

Figure 8:
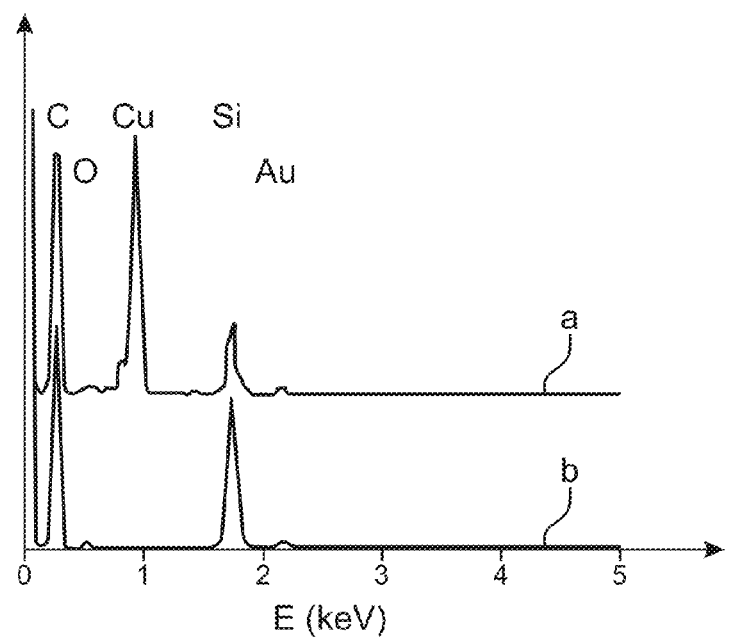
FIG. 8 represents a spectrum obtained by energy-dispersive X-ray analysis (the abscissa representing the energy E in keV) of a nanowire (curve b) obtained according to Example 2 which appears below.

FIG. 8 represents an X-ray spectrum which demonstrates the absence of copper in the body of the nanowires (curve b) in comparison with the compound comprising copper oxide (curve a), thus proving the good quality of the nanowires which are obtained by the method of the invention and are shown in FIGS. 6 and 7.

EXAMPLE 3

In this example, silicon nanowires are produced by a particular embodiment according to the method of the invention. This example was carried out with industrial deposition equipment of the CENTURA 5200 type receiving 200 mm substrates.

The substrate used is a silicon substrate having a (100) crystal orientation, whose face intended to act as a support for production of the nanowires is covered with a barrier layer, here 10 nm of TiN. A layer of copper oxide with a thickness of 20 nm is deposited on the barrier layer by reactive sputtering.

The substrate is then subjected to a step of contact with a silicon precursor, silane $SiH_4$, at a pressure which is sufficient to generate growth of the nanowires. There is no oxidation step since the copper oxide is deposited directly.

The specific characteristics of the various steps mentioned above appear in the following table.

| Steps | Gas | Flow rate | Pressure | Time |
|---|---|---|---|---|
| Contact with silicon precursor | $SiH_4$ | 100 sccm* | 30 Torr | 2400 s |
| Pumping | — | — | — | 20 s |

*sccm signifying one cubic centimetre per minute under the following conditions (T = 0° C. (32° F.) and P = 101 325 Pa)

All the steps were carried out at a temperature of not more than 400° C.

Figure 9:
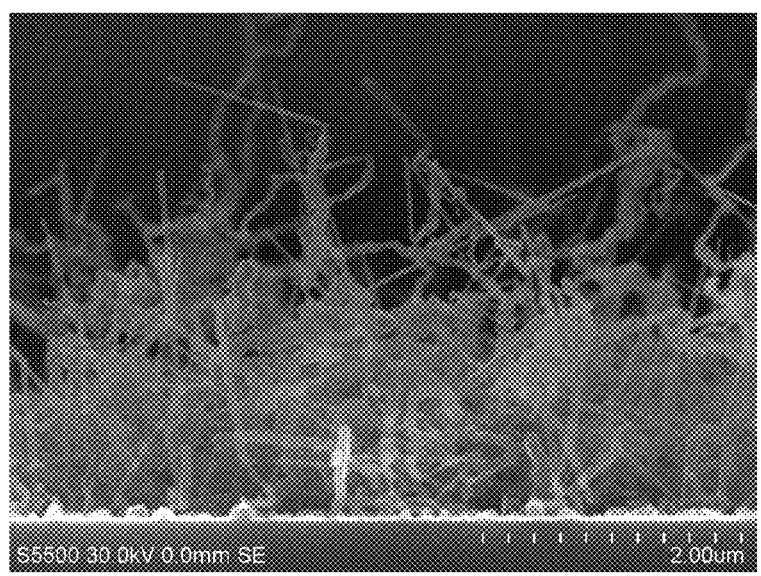
FIG. 9 is an image taken by scanning electron microscopy of the nanowires obtained according to the embodiment explained in Example 3.

An image of the substrate (view in section) obtained following this example (represented in FIG. 9) was taken by scanning electron microscopy (SEM) verifying effective growth of nanowires on the entire surface of the substrate.

References Cited

[1] Applied Physics Letters, Vol. 4, No 5, p. 89-90
[2] Nature Technology, Vol. 1, December 2006, p. 186-189
[3] Material Letters, 61 (2007), p. 177-181

The invention claimed is:

1. A method for fabricating silicon and/or germanium nanowires on a substrate, comprising:
   a step of contacting a precursor comprising silicon and/or a precursor comprising germanium in contact with a compound comprising copper oxide present on said substrate, by means of which growth of nanowires takes place, said substrate being a silicon substrate, optionally covered with a barrier layer against the diffusion of copper present in said compound,
   said step of contacting consisting of passing a stream of precursor comprising silicon and/or precursor comprising germanium over the compound comprising copper oxide, with a flow rate and for a time which are effective for obtaining growth of nanowires based on silicon and/or germanium.

2. The method according to claim 1, in which the barrier layer is made of a metal, a metal nitride or a mixture thereof.

3. The method according to claim 1, in which the barrier layer is made of tantalum, tantalum nitride, titanium nitride, or a mixture thereof.

4. The method according to claim 1, in which the compound comprising copper oxide is in the form of particles which are separate from one another.

5. The method according to claim 1, in which the compound comprising copper oxide consists of copper oxide on its own or a mixture of the metallic copper and copper oxide.

6. The method according to claim 1, further comprising, before the contact step, a step of fabricating the compound comprising copper oxide on the substrate.

7. The method according to claim 6, in which the fabrication step consists of depositing the compound comprising copper oxide directly on the substrate.

8. The method according to claim 6, in which the fabrication step consists of first depositing metallic copper or copper in oxidation state zero on said substrate and then, second, fully or partially oxidizing the metallic copper to form copper oxide.

9. The method according to claim 8, in which the oxidation step consists of passing a stream of oxygen over the metallic copper deposited on said substrate.

10. The method according to claim 1, in which the precursor comprising silicon is silane $SiH_4$, disilane $Si_2H_6$, trisilane $Si_3H_8$ or a halosilane $SiX_4$, X being a halogen atom.

11. The method according to claim 1, in which the precursor comprising germanium is germane $GeH_4$, digermane $Ge_2H_6$ or trigermane $Ge_3H_8$.

12. The method according to claim 1, in which the precursor comprising silicon and/or the precursor comprising germanium is diluted with a neutral carrier gas and/or a reducing gas.

13. The method according to claim 1, in which, during the contact step, a doping agent is brought into contact with the precursor comprising silicon and/or the precursor comprising germanium.

14. The method according to claim 1, in which the stream of precursor comprising silicon and/or precursor comprising germanium is in the form of a plasma.

15. The method according to claim 1, in which the contact step is carried out at a temperature of less than 450° C.

* * * * *